US011171389B2

(12) United States Patent
Okuda

(10) Patent No.: US 11,171,389 B2
(45) Date of Patent: Nov. 9, 2021

(54) SECONDARY BATTERY AND METHOD FOR PRODUCING THE SAME

(71) Applicant: KABUSHIKI KAISHA TOYOTA CHUO KENKYUSHO, Nagakute (JP)

(72) Inventor: Chikaaki Okuda, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 193 days.

(21) Appl. No.: 16/488,863

(22) PCT Filed: Feb. 9, 2018

(86) PCT No.: PCT/JP2018/004689
§ 371 (c)(1),
(2) Date: Aug. 26, 2019

(87) PCT Pub. No.: WO2018/168286
PCT Pub. Date: Sep. 20, 2018

(65) Prior Publication Data
US 2020/0028141 A1 Jan. 23, 2020

(30) Foreign Application Priority Data

Mar. 13, 2017 (JP) .............................. JP2017-047348
Mar. 13, 2017 (JP) .............................. JP2017-047349

(51) Int. Cl.
*H01M 2/16* (2006.01)
*H01M 4/583* (2010.01)
(Continued)

(52) U.S. Cl.
CPC ........... *H01M 50/46* (2021.01); *H01M 4/583* (2013.01); *H01M 50/403* (2021.01);
(Continued)

(58) Field of Classification Search
None
See application file for complete search history.

(56) References Cited

U.S. PATENT DOCUMENTS 5,612,155 A * 3/1997 Takami ............. H01M 10/0525
429/331
5,753,387 A 5/1998 Takami et al.
(Continued)

FOREIGN PATENT DOCUMENTS

JP H05-41206 A 2/1993
JP H09-204929 A 8/1997
(Continued)

OTHER PUBLICATIONS

Apr. 23, 2019 Office Action issued in Japanese Patent Application No. 2017-047349.
(Continued)

*Primary Examiner* — Lisa S Park
(74) *Attorney, Agent, or Firm* — Oliff PLC

(57) ABSTRACT

A secondary battery includes a first electrode which is a columnar body having a first active material; a first current collecting unit connected to the first electrode; a second electrode having a second active material; a second current collecting unit connected to the second electrode; and a separation membrane that has ion conductivity and insulates between the first electrode and the second electrode. The secondary battery has a structure in which a plurality of the first electrodes are bound together while being adjacent to the second electrode with the separation membrane therebetween. A first connecting unit that is connected to the first electrode and melts when short-circuiting occurs may be connected to the first current collecting unit.

12 Claims, 13 Drawing Sheets

(51) Int. Cl.
　　　*H01M 2/34*　　(2006.01)
　　　*H01M 2/14*　　(2006.01)
　　　*H01M 2/18*　　(2006.01)
　　　*H01M 50/46*　　(2021.01)
　　　*H01M 50/403*　　(2021.01)
　　　*H01M 50/463*　　(2021.01)
　　　*H01M 50/581*　　(2021.01)
　　　*H01M 4/02*　　(2006.01)

(52) U.S. Cl.
　　　CPC ....... *H01M 50/463* (2021.01); *H01M 50/581* (2021.01); *H01M 2004/021* (2013.01); *H01M 2200/103* (2013.01)

(56) References Cited

U.S. PATENT DOCUMENTS

| | | | |
|---|---|---|---|
| 5,916,706 A * | 6/1999 | Berkey | H01M 50/463 429/131 |
| 6,350,544 B1 | 2/2002 | Takami et al. | |
| 2002/0015892 A1 | 2/2002 | Kitoh | |
| 2007/0224510 A1 * | 9/2007 | Yamamoto | H01M 4/624 429/232 |
| 2009/0142656 A1 | 6/2009 | Nathan et al. | |
| 2012/0009331 A1 | 1/2012 | Kwon et al. | |
| 2012/0219844 A1 | 8/2012 | Tsutsumi et al. | |
| 2013/0244085 A1 * | 9/2013 | Coors | H01M 50/463 429/160 |
| 2014/0212719 A1 | 7/2014 | Kwon et al. | |
| 2014/0377452 A1 | 12/2014 | Kwon et al. | |
| 2016/0049635 A1 * | 2/2016 | Park | H01M 50/581 429/161 |
| 2016/0164064 A1 | 6/2016 | Lahiri et al. | |
| 2017/0317377 A1 | 11/2017 | Inoue et al. | |

FOREIGN PATENT DOCUMENTS

| | | |
|---|---|---|
| JP | H09-306489 A | 11/1997 |
| JP | H11-73961 A | 3/1999 |
| JP | H11-345630 A | 12/1999 |
| JP | 2001-126736 A | 5/2001 |
| JP | 2003-317794 A | 11/2003 |
| JP | 2004-39648 A | 2/2004 |
| JP | 2005-149794 A | 6/2005 |
| JP | 2008-505434 A | 2/2008 |
| JP | 2012-527085 A | 11/2012 |
| JP | 2014-22273 A | 2/2014 |
| JP | 2014-532277 A | 12/2014 |
| JP | 2015-515723 A | 5/2015 |
| WO | 2011/007548 A1 | 1/2011 |
| WO | 2016/068071 A1 | 5/2016 |

OTHER PUBLICATIONS

May 1, 2018 International Search Report issued in International Application No. PCT/JP2018/004689.

* cited by examiner

Fig. 10A  
(a) Heat treatment step
Fig. 10B  
(b) Separation membrane forming step
Fig. 10C  
(c) Second active material forming step
    
Fig. 10D  
(d) Conductive material adding step
Fig. 10E  
(e) Binding step
  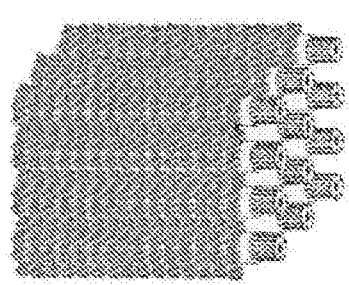

Fig. 15

| Structure: | 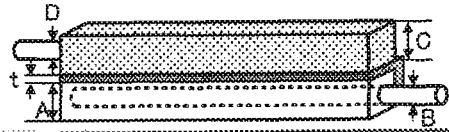 | | |
|---|---|---|---|
| | Example 2 | Example 3 | Example 4 |
| Positive electrode: side A ($\mu$m) | 100 | 150 | 200 |
| Current collecting wire: Diameter B ($\mu$m) | 30 | 40 | 50 |
| Separation membrane: thickness t ($\mu$m) | 5 | 10 | 10 |
| Negative electrode: side C ($\mu$m) | 110 | 170 | 220 |
| Current collecting wire: Diameter D ($\mu$m) | 30 | 35 | 50 |
| Volume fraction of positive/negative electrode mixture (%) | 85.5 | 85.1 | 87.3 |
| Positive-negative electrode opposing area ($cm^2$) | 174 | 110.7 | 86.8 |
| Distance between positive and negative electrodes($\mu$m) (80 vol%) | 57 | 92 | 118 |

| Structure: | 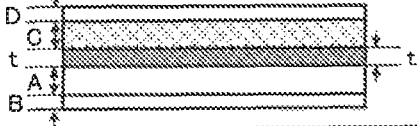 | |
|---|---|---|
| | Comparative example 1 | Comparative example 2 |
| Positive electrode: thickness A ($\mu$m) | 25 | 81 |
| Current collecting foil: thickness B ($\mu$m) | 7.5 | 7.5 |
| Separation membrane: thickness t ($\mu$m) | 20 | 12 |
| Negative electrode: thickness C ($\mu$m) | 35 | 106 |
| Current collecting foil: thickness D ($\mu$m) | 5 | 5 |
| Volume fraction of positive/negative electrode mixture (%) | 64.9 | 88.4 |
| Positive-negative electrode opposing area ($cm^2$) | 108.1 | 47.3 |
| Distance between positive and negative electrodes($\mu$m) (80 vol%) | 68 | 162 |

Fig. 16

| Structure: | 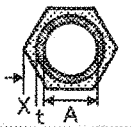 | | |
|---|---|---|---|
| | Example 5 | Example 6 | Reference example 1 |
| Negative electrode: Diameter A (μm) | 20 | 50 | 50 |
| Separation membrane: thickness t (μm) | 5 | 5 | 5 |
| Positive electrode: thickness X (μm) | 5.5 | 15 | 15 |
| Positive/negative electrode volume ratio (mAh/g)/(mAh/g) | 1.0 | 1.0 | 1.0 |
| Capacity of negative electrode (mAh/g) | 350 | 350 | 400 |
| Capacity of positive electrode (mAh/g) | 190 | 190 | 250 |
| Electrode energy density (Wh/L) | 815 | 1060 | 1345 |
| Cell efficiency (%) | 80 | 80 | 80 |
| Positive-negative electrode opposing area (cm²) | 580 | 300 | 320 |
| Cell energy density (Wh/L) | 650 | 850 | 1075 |
| Structure: | 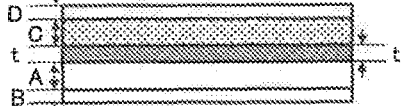 | | |
| | Comparative example 3 | Comparative example 4 | Comparative example 5 |
| Positive electrode: thickness A (μm) | 115 | 58 | 14 |
| Current collecting foil: thickness B (μm) | 6 | 6 | 6 |
| Separation membrane: thickness t (μm) | 5 | 5 | 5 |
| Negative electrode: thickness C (μm) | 160 | 80 | 20 |
| Current collecting foil: thickness D (μm) | 6 | 6 | 6 |
| Positive/negative electrode volume ratio (mAh/g)/(mAh/g) | 1.2 | 1.2 | 1.2 |
| Capacity of negative electrode (mAh/g) | 350 | 350 | 350 |
| Capacity of positive electrode (mAh/g) | 190 | 190 | 190 |
| Electrode energy density (Wh/L) | 914 | 865 | 645 |
| Cell efficiency (%) | 70 | 70 | 70 |
| Positive-negative electrode opposing area (cm²) | 35 | 65 | 200 |
| Cell energy density (Wh/L) | 635 | 605 | 450 |

SECONDARY BATTERY AND METHOD FOR PRODUCING THE SAME

TECHNICAL FIELD

The invention disclosed in the present description relates to a secondary battery and a method for producing the same.

BACKGROUND ART

An example of this type of secondary battery proposed thus far is a cable-type secondary battery that includes a lithium ion-supplying core unit that contains an electrolyte, an inner electrode that surrounds an outer surface of the core unit and includes a three-dimensional network structure current collector having an outer surface covered with an inner electrode active material, and an outer electrode that surrounds an outer surface of the inner electrode and includes an outer electrode active material layer (for example, refer to PTL 1). In this secondary battery, the electrolyte in the core unit readily penetrates the active material of the electrode, and thus the battery capacity properties and cycle properties are excellent.

Another example of this type of secondary battery proposed thus far is a battery that includes an inner electrode assembly in which a positive electrode plate and a negative electrode plate are wound or stacked with a separator therebetween, in which the total cross-sectional area of a current-collecting tab is set to be more than or equal to a particular area to prevent melting during charging and discharging (for example, refer to PTL 2). In this secondary battery, the current-collecting tab is configured to melt in response to overcurrent and thus functions as a current fuse and thereby improves safety. Another proposed example of the secondary battery is a battery in which a temperature fuse that blocks electrical conduction at a separator softening temperature or lower is connected to a cylindrical inner space at the center of a wound electrode plate group (for example, refer to PTL 3). In this secondary battery, a space-saving safety mechanism can be provided without degradation of battery performance.

CITATION LIST

Patent Literature

PTL 1: Japanese Unexamined Patent Application Publication (Translation of PCT Application) No. 2014-532277
PTL 2: Japanese Unexamined Patent Application Publication No. 11-345630
PTL 3: Japanese Unexamined Patent Application Publication No. 5-41206

SUMMARY OF INVENTION

Technical Problem

In recent years, lithium secondary batteries have been required to achieve larger capacities and higher energy densities per unit volume. For example, in order to increase the battery capacity of a secondary battery including stacked electrodes, the thickness of active material layers must be increased; however, increasing the thickness of the electrodes increases the length of the electrolyte solution flow path in the thickness direction, and makes it difficult to moderate the ion concentration gradient in the thickness direction. In the lithium ion secondary battery of PTL 1 described above, increasing the energy density has not been fully considered.

The present disclosure addresses such a problem and a main object thereof is to provide a novel secondary battery that can further increase the energy density.

In addition, secondary batteries have been required to achieve larger capacities and higher energy densities per unit volume as well as higher safety. For example, in the secondary batteries of PTL 2 and PTL 3 described above, safety is considered, but increasing the energy density is not fully considered; thus, a novel secondary battery that can further enhance safety and increase the energy density has been desired.

The present disclosure addresses such a problem and an object thereof is to provide a novel secondary battery that can increase the energy density and that can further enhance safety.

Solution to Problem

As a result of extensive studies conducted to achieve the object described above, the inventors have found that the energy density can be further increased by employing a structure in which multiple columnar electrodes are bound together and connected to a current collecting unit, and have completed the invention disclosed in the present description.

In other words, a secondary battery disclosed in the present description includes:
  a first electrode which is a columnar body having a first active material;
  a first current collecting unit connected to the first electrode;
  a second electrode having a second active material;
  a second current collecting unit connected to the second electrode; and
  a separation membrane that has ion conductivity and insulates between the first electrode and the second electrode,
  in which the secondary battery has a structure in which a plurality of the first electrodes are bound together while being adjacent to the second electrode with the separation membrane therebetween.

A method for producing a secondary battery disclosed in the present description includes:
  a separation membrane forming step of forming a separation membrane having ion conductivity and an insulating property on a surface of a first electrode which is a columnar body having a first active material; and
  a binding step of binding a plurality of the first electrodes while being adjacent to a second electrode having a second active material with the formed separation membrane therebetween.

The present disclosure can provide a secondary battery with an increased energy density and a method for producing the same. The reasons behind such an effect is presumably as follows. For example, in an existing electrode structure in which current collectors formed of metal foils with an active material formed thereon are stacked with separators therebetween, the coating amount and density of the electrode mixture on the current collecting foils must be increased in order to increase the energy density, thereby causing disadvantages such as degradation of ion conductivity. In contrast, according to the secondary battery of the present disclosure, the ion conduction distance can be shortened by employing a structure in which columnar electrodes are bound together. Moreover, according to the secondary battery of the present disclosure, current collectors do not have to be formed inside the structure, and the separators and the like may be replaced by separation membranes to reduce thickness and increase the active material space occupancy rate. Presumably thus, the energy density can be further increased.

As a result of extensive studies conducted to achieve the object described above, the inventors have found that the energy density can be increased and the safety can be enhanced by employing a structure in which columnar electrodes are bound together and are connected to the current collecting unit so that the connecting portions can be used as the fuse mechanism. Thus, the invention disclosed in the present description is completed.

That is, a secondary battery disclosed in the present description includes:
  a first electrode which is a columnar body having a first active material;
  a first current collecting unit connected to the first electrode;
  a second electrode having a second active material;
  a second current collecting unit connected to the second electrode; and
  a separation membrane that has ion conductivity and insulates between the first electrode and the second electrode,
  in which the secondary battery has a structure in which a plurality of the first electrodes are bound together while being adjacent to the second electrode with the separation membrane therebetween, and
  the secondary battery has at least one fuse structure selected from a structure in which a first connecting unit that is connected to the first electrode and melts when short-circuiting occurs is connected to the first current collecting unit and a structure in which a second connecting unit that is connected to the second electrode and melts when short-circuiting occurs is connected to the second current collecting unit.

The present disclosure can provide a secondary battery having an increased energy density and enhanced safety. The reason behind this effect is that, for example, the energy density can be increased by employing a structure in which columnar electrodes are bound together. In addition, the safety can be further enhanced by using the connecting unit, which electrically connects the bound-structure electrode to the current collecting unit, as the fuse mechanism.

BRIEF DESCRIPTION OF DRAWINGS

FIG. 10 includes diagrams illustrating one example of steps for producing the secondary battery 30A.

FIG. 15 is a table indicating relationships involving the volume fraction of the positive/negative electrode mixture, the positive-negative electrode opposing area, and the distance between the positive and negative electrodes at 80 vol % of the electrode in a columnar body bound structure and an electrode foil stacked structure.

FIG. 16 is a table indicating relationships involving the volume fraction of the positive/negative electrode mixture, the positive-negative electrode opposing area, and the cell energy density in a columnar body bound structure and an electrode foil stacked structure.

DESCRIPTION OF EMBODIMENTS

A secondary battery described in the embodiment is equipped with a first electrode, which is a columnar body, a first current collecting unit, a first connecting unit, a second electrode, a second current collecting unit, a second connecting unit, and a separation membrane. The first connecting unit and the second connecting unit constitute a fuse mechanism. In this secondary battery, the first electrode may be a positive electrode that contains a positive electrode active material as a first active material, and the second electrode may be a negative electrode that contains a negative electrode active material as a second active material. Alternatively, in this secondary battery, the first electrode may be a negative electrode that contains a negative electrode active material, and the second electrode may be a positive electrode that contains a positive electrode active material. Each of the electrodes may contain a conductive material and/or a binder in addition to the active material. The first electrode may be a columnar body, such as a circular column or a polygonal prism, and the second electrode may be a columnar body, such as a circular column or a polygonal prism. In addition, at least one of the first electrode and the second electrode is to be columnar, and thus the other may have a shape other than columnar. Alternatively, the first electrode may or may not have a current collecting member embedded therein, the current collecting member being at least one selected from a current collecting wire, a current collecting foil, and a three-dimensional network structure. The second electrode may or may not have a current collecting member embedded therein, the current collecting member being at least one selected from a current collecting wire, a current collecting foil, and a three-dimensional network structure. The fuse mechanism may be equipped with at least one of the first connecting unit and the second connecting unit or both of the first connecting unit and the second connecting unit. Here, for the sake of simplicity, a lithium secondary battery in which a first electrode 11 is a negative electrode, a second electrode 16 is a positive electrode, and lithium ions are a carrier is described below as a main example.

First Embodiment

Figure 1:
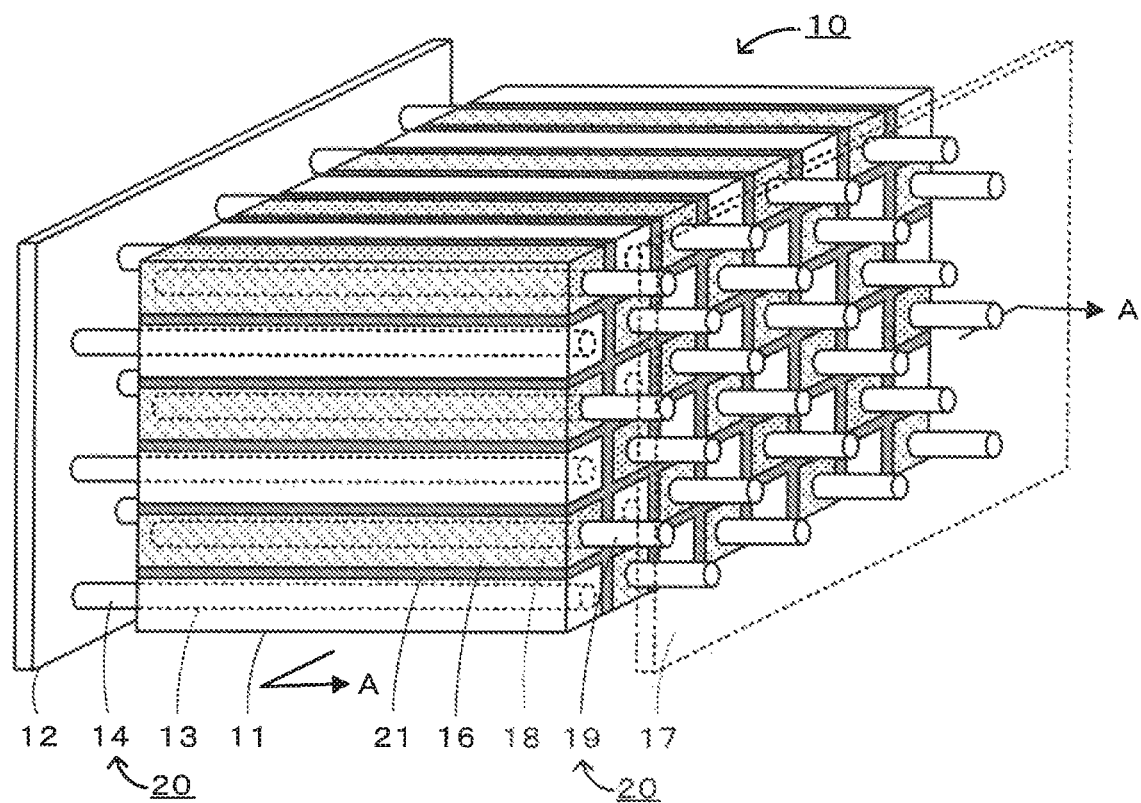
FIG. 1 is a schematic diagram illustrating one example of a secondary battery 10.
Figure 2:
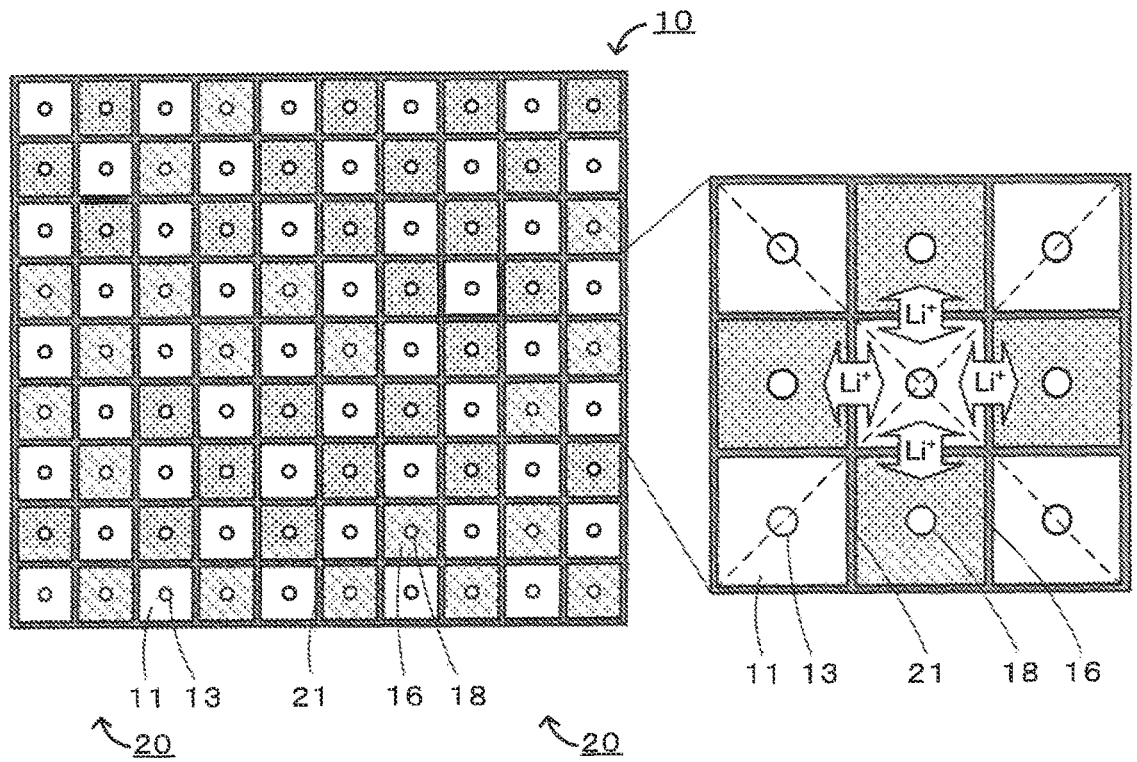
FIG. 2 is an A-A cross-sectional view of the secondary battery 10.
Figure 3:
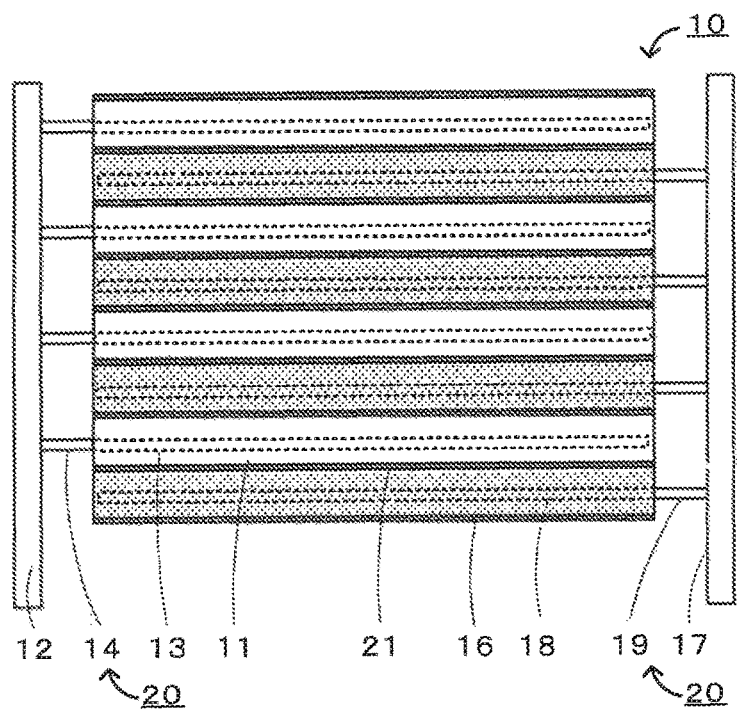
FIG. 3 is a plan view of the secondary battery 10.

Next, a secondary battery disclosed in this embodiment is described with reference to the drawings. FIG. 1 is a schematic diagram illustrating one example of a secondary battery 10. FIG. 2 is an A-A cross-sectional view of the secondary battery 10 illustrated in FIG. 1. FIG. 3 is a plan view of the secondary battery 10. As illustrated in FIGS. 1 to 3, the secondary battery 10 is equipped with first electrodes 11, a first current collecting unit 12, current collecting wires 13, first connecting units 14, second electrodes 16, a second current collecting unit 17, current collecting wires 18, second connecting units 19, and separation membranes 21. The first connecting units 14 and the second connecting units 19 constitute a fuse mechanism 20.

The first electrode 11 is a columnar body having a first active material. The first electrode 11 is a rectangular prism having a rectangular cross section. This secondary battery 10 may have a structure in which fifty or more first electrodes 11 are bound together. For example, the first electrode 11 may have a capacity equal to 1/n of the cell capacity, and n first electrodes 11 may be connected in parallel to the first current collecting unit 12. The outer perimeter of the first electrode 11 other than the end surfaces opposes the second electrodes 16 with the separation membranes 21 therebetween. The first electrode 11 is preferably a columnar body in which the length of one side in a direction orthogonal to the longitudinal direction is 100 µm or more and 300 µm or less. Within this range, the energy density per unit volume can be further increased. In addition, within this range, the carrier ion travelling distance can be further shortened, and charging and discharging can be performed at higher current.

The first electrode 11 contains the first active material; however, when the first active material is not electrically conductive, for example, a mixture of the first active material and a conductive material may be used to form the first electrode 11. The first electrode 11 may be prepared by, for example, forming a mixture of the first active material and, if needed, a conductive material and a binder. Examples of the first active material include materials that can store and release lithium serving as a carrier. Examples of the first active material include inorganic compounds such as lithium metal, lithium alloys, and tin compounds, carbonaceous materials that can store and release lithium ions, complex oxides containing multiple elements, and conductive polymers. Examples of the carbonaceous material include cokes, glassy carbons, graphites, ingraphitizable carbons, pyrolytic carbons, and carbon fibers. Among these, graphites such as artificial graphite and natural graphite are preferable. Moreover, carbon fibers having a graphite structure may be used. Such carbon fibers preferably have crystals oriented in the longitudinal direction, which is a fiber direction, for example. Moreover, when viewed in a cross section taken in a direction orthogonal to the longitudinal direction (fiber direction), crystals are preferably oriented radially from the center toward the outer perimeter surface (refer to FIGS. 8 and 9 described below). Examples of the complex oxide include lithium titanium complex oxide and lithium vanadium complex oxide. The conductive material may be any electron-conducting material that does not adversely affect the battery performance, and can be one or mixture of two or more of graphite such as natural graphite (vein graphite and flake graphite) and artificial graphite, acetylene black, carbon black, Ketjen black, carbon whisker, needle coke, carbon fibers, and a metal (copper, nickel, aluminum, silver, gold, and the like). The binder serves to keep a particular shape by binding first active material particles and conductive material particles together; and, for example, fluorine-containing resins such as polytetrafluoroethylene (PTFE), polyvinylidene fluoride (PVdF), and fluororubber, thermoplastic resins such as polypropylene and polyethylene, ethylene propylene diene monomer (EPDM) rubber, sulfonated EPDM rubber, and natural butyl rubber (NBR) can be used alone or in combination as a mixture. In addition, a cellulose, which is a water-based binder, and an water dispersion of styrene butadiene rubber (SBR) or the like can also be used.

The first active material content in the first electrode 11 is preferably large, and is preferably 70 vol % or more and more preferably 80 vol % or more relative to the total volume of the first electrode 11. The conductive material content is preferably in the range of 0 vol % or more and 20 vol % or less and is more preferably in the range of 0 vol % or more and 15 vol % or less relative to the total volume of the electrode mixture containing the first active material. Within such a range, sufficient conductivity can be imparted while suppressing the decrease in battery capacity. The binder content is preferably in the range of 0.1 vol % or more and 5 vol % or less and is more preferably in the range of 0.2 vol % or more and 1 vol % or less relative to the total volume of the first electrode 11.

The current collecting wire 13 having a circular cross section is embedded in the first electrode 11. The current collecting wire 13 is preferably formed of a conductive material, for example, a metal such as aluminum, copper, titanium, stainless steel, nickel, iron, or platinum. The current collecting wire 13 is extended to the outside so as to constitute the first connecting unit 14. The length (thickness) of the current collecting wire 13 in the radial direction may be the same as or different from that of the first connecting unit 14. The length of the current collecting wire 13 in the radial direction is preferably 50 µm or less, more preferably 40 µm or less, and yet more preferably 30 µm or less, for example. The current collecting wire 13 is preferably as thin as possible while securing the conductivity because the energy density per unit volume can be further improved. The length of the current collecting wire 13 in the radial direction is preferably 1 µm or more, more preferably 5 µm or more, and yet more preferably 10 µm or more, for example. From the viewpoint of securing the conductivity, the current collecting wire 13 is preferably thick.

The first current collecting unit 12 is a conductive member and is electrically connected to the first electrodes 11. To the first current collecting unit 12, fifty or more first electrodes are connected in parallel via the current collecting wires 13. The first current collecting unit 12 can be formed of, for example, carbon paper, aluminum, copper, titanium, stainless steel, nickel, iron, platinum, baked carbon, a conductive polymer, a conductive glass, or, for improving adhesion, conductivity, and oxidation (reduction) resistance, aluminum, copper, or the like having a surface treated with carbon, nickel, titanium, silver, platinum, gold, or the like. The shape of the first current collecting unit 12 is not particularly limited as long as multiple current collecting wires 13 can be connected, and examples thereof include a plate shape, a foil shape, a film shape, a sheet shape, a net shape, a punched or expanded body, a lath body, a porous body, a foam, and a formed body of a fiber group.

The second electrode 16 is a columnar body having a second active material. The second electrode 16 is a rectangular prism having a rectangular cross section. This secondary battery 10 may have a structure in which fifty or more second electrodes 16 are bound together. For example, the second electrode 16 may have a capacity equal to 1/n of the cell capacity, and n second electrodes 16 may be connected in parallel to the second current collecting unit 17. The outer perimeter of the second electrode 16 other than the end surfaces opposes the first electrodes 11 with the separation membranes 21 therebetween. The second electrode 16 is preferably a columnar body in which the length of one side in a direction orthogonal to the longitudinal direction is 100 μm or more and 300 μm or less. Within this range, the energy density per unit volume can be further increased. In addition, within this range, the carrier ion travelling distance can be further shortened, and charging and discharging can be performed at higher current.

The second electrode 16 contains the second active material; however, when the second active material is not electrically conductive, for example, a mixture of the second active material and a conductive material may be used to form the second electrode 16. The second electrode 16 may be prepared by forming a mixture containing the second active material and, if needed, a conductive material and a binder. Examples of the second active material include materials that can store and release lithium serving as a carrier. Examples of the second active material include compounds having lithium and a transition metal, such as an oxide containing lithium and a transition metal element and a phosphate compound containing lithium and a transition metal element. Specific examples of the compounds that can be used include: a lithium manganese complex oxide having a basic compositional formula of $Li_{(1-x)}MnO_2$ (0<x<1 or the like, the same applies hereinafter), $Li_{1-x)}Mn_2O_4$, or the like; a lithium cobalt complex oxide having a basic compositional formula of $Li_{(1-x)}CoO_2$ or the like; a lithium nickel complex oxide having a basic compositional formula of $Li_{(1-x)}NiO_2$ or the like; a lithium cobalt nickel manganese complex oxide having a basic compositional formula of $Li_{(1-x)}Co_aNi_bMn_cO_2$ (a>0, b>0, c>0, and a+b+c=1) or the like; a lithium vanadium complex oxide having a basic compositional formula of $LiV_2O_3$ or the like; and a transition metal oxide having a basic compositional formula of $V_2O_5$ or the like. A lithium iron phosphate compound having a basic compositional formula of $LiFePO_4$ or the like can be used as the positive electrode active material. Among these, a lithium cobalt nickel manganese complex oxide, for example, $LiCo_{1/3}Ni_{1/3}Mn_{1/3}O_2$ or $LiNi_{0.4}Co_{0.3}Mn_{0.3}O_2$, or the like is preferable. The "basic compositional formula" means that other elements, such as Al and Mg, may be contained as components.

The second active material content in the second electrode 16 is preferably large, and is preferably 70 vol % or more and more preferably 80 vol % or more relative to the total volume of the second electrode 16. The conductive material content is preferably in the range of 0 vol % or more and 20 vol % or less and is more preferably in the range of 0 vol % or more and 15 vol % or less relative to the total volume of the second electrode 16. Within this range, sufficient conductivity can be imparted while suppressing the decrease in battery capacity. The binder content is preferably in the range of 0.1 vol % or more and 5 vol % or less and is more preferably in the range of 0.2 vol % or more and 1 vol % or less relative to the total volume of the second electrode 16.

The current collecting wire 18 having a circular cross section is embedded in the second electrode 16. The current collecting wire 18 is preferably formed of a conductive material, for example, a metal such as aluminum, copper, titanium, stainless steel, nickel, iron, or platinum. The current collecting wire 18 is extended to the outside so as to constitute the second connecting unit 19. The length (thickness) of the current collecting wire 18 in the radial direction is the same as that of the current collecting wire 13.

The second current collecting unit 17 is a conductive member and is electrically connected to the second electrodes 16. To the second current collecting unit 17, fifty or more second electrodes 16 are connected in parallel via the current collecting wires 18. The second current collecting unit 17 may be the same as the first current collecting unit 12.

The separation membrane 21 has ion conductivity for the ions (for example, lithium ions) serving as a carrier, and insulates between the first electrode 11 and the second electrode 16. The separation membranes 21 are formed on the entire outer perimeter surface of the first electrode 11 opposing the second electrode 16 and the entire outer perimeter surface of the second electrode 16 opposing the first electrode 11 and prevent short-circuiting between the first electrode 11 and the second electrode 16. The separation membrane 21 is preferably a polymer having ion conductivity and an insulating property. Examples of the separation membrane 21 include a copolymer of polyvinylidene fluoride (PVdF) and hexafluoropropylene (HFP), polymethyl methacrylate (PMMA), and a copolymer of PMMA and an acrylic polymer. For example, with a copolymer of PVdF and HFP, a part of the electrolyte solution causes the membrane to swell and gelate so that the membrane serves as an ion conducting membrane. The thickness t of the separation membrane 21 is preferably 0.5 μm or more, more preferably 2 μm or more, and yet more preferably 5 μm or more, for example. In order to secure the insulating property, the thickness t is preferably 0.5 μm or more. The thickness t of the separation membrane 21 is preferably 20 μm or less and more preferably 10 μm or less. In order to suppress degradation of the ion conductivity, the thickness t is preferably 20 μm or less. The ion conductivity and the insulating property are excellent when the thickness t is in the range of 0.5 to 20 μm. The separation membrane 21 may be formed by dipping the first electrode 11 or the second electrode 16 in a solution containing the raw material so as to cover the surface of the electrode, for example.

The separation membrane 21 may contain an ion-conducting medium that conducts ions serving as a carrier. An example of the ion-conducting medium is an electrolyte solution prepared by dissolving a supporting salt in a solvent. An example of the solvent for the electrolyte solution is a solvent of a non-aqueous electrolyte solution. Examples of the solvent include carbonates, esters, ethers, nitriles, furans, sulfolanes, and dioxolanes, and these may be used alone or in combination as a mixture. Specific examples of the carbonates include cyclic carbonates such as ethylene carbonate (EC), propylene carbonate, vinylene carbonate, butylene carbonate, and chloroethylene carbonate and linear carbonates such as dimethyl carbonate (DMC), ethyl methyl carbonate (EMC), diethyl carbonate, ethyl-n-butyl carbonate, methyl-t-butyl carbonate, di-i-propyl carbonate, and t-butyl-i-propyl carbonate; specific examples esters include cyclic esters such as γ-butyrolactone and γ-valerolactone and linear esters such as methyl formate, methyl acetate, ethyl acetate, and methyl butyrate; specific examples of the ethers include dimethoxyethane, ethoxymethoxymethane, and diethoxyethane; specific examples of the nitriles include acetonitrile and benzonitrile; specific examples of the furans include tetrahydrofuran and methyltetrahydrofuran; specific examples of sulfolanes include sulfolane and tetramethylsulfolane; and specific examples of dioxolane include 1,3-dioxolane and methyldioxolane. The supporting salt contains, for example, ions that serve as a carrier for the secondary battery 10. Examples of the supporting salt include $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_6$, $LiAlF_4$, $LiSCN$, $LiClO_4$, $LiCl$, $LiF$, $LiBr$, $LiI$, and $LiAlCl_4$. Among these, one or a combination of two or more salts selected from the group consisting of inorganic salts such as $LiPF_6$, $LiBF_4$, and $LiClO_4$ and organic salts such as $LiCF_3SO_3$, $LiN(CF_3SO_2)_2$, and $LiC(CF_3SO_2)_3$ is preferably used from the viewpoint of electrical properties. The concentration of the supporting salt in the electrolyte solution is preferably 0.1 mol/L or more and 5 mol/L or less and more preferably 0.5 mol/L or more and 2 mol/L or less.

The fuse mechanism 20 includes the first connecting units 14 and the second connecting units 19. The first connecting unit 14 is a member having one end connected to the first electrode 11 and the other end connected to the first current collecting unit 12, and melts when short-circuiting occurs inside the secondary battery 10. Each of the many first electrodes 11 has one first connecting unit 14 electrically connected thereto. The second connecting unit 19 is a member having one end connected to the second electrode 16 and the other end connected to the second current collecting unit 17, and melts when short-circuiting occurs inside the secondary battery 10. Each of the many second electrodes 16 has one second connecting unit 19 electrically connected thereto. The first connecting unit 14 is formed to be thinner than the first electrode 11, and the second connecting unit 19 is formed to be thinner than the second electrode 16. This fuse mechanism 20 may include first connecting units 14 and second connecting units 19 such that the electronic resistance in the electrode of the same polarity is more than or equal to twice the electronic resistance of the first connecting units 14 and the second connecting units 19. As long as the electronic resistance of the first connecting units 14 and the second connecting units 19 is lower, current flows easily when internal short-circuiting occurs and promotes melting, and thus the fuse mechanism functions easily. The length (thickness) of the first connecting unit 14 in the radial direction is preferably 50 μm or less, more preferably 40 μm or less, and yet more preferably 30 μm or less, for example. The first connecting unit 14 is preferably as thin as possible while securing the conductivity. The length of the first connecting unit 14 in the radial direction is preferably 1 μm or more, more preferably 5 μm or more, and yet more preferably 10 μm or more, for example. From the viewpoint of securing the conductivity, the first connecting unit 14 is preferably thick. The length of the first connecting unit 14 in the radial direction may be empirically determined on the basis of the current distribution properties at normal times and ease of melting when internal short-circuiting occurs, for example. The second connecting unit 19 is the same as the first connecting unit 14.

As illustrated in FIGS. 1 to 3, this secondary battery 10 has a structure in which first electrodes 11 and second electrodes 16, which are columnar bodies, are alternately arranged with the separation membranes 21 therebetween, and are bound together. Since the electrodes of the secondary battery 10 are fine columnar bodies, the electrodes can store and release the carrier ions from the entire perimeters (refer to FIG. 2). According to this electrode structure, since carrier ions are stored in and released from the entire perimeters, the reaction is accelerated by the increase in positive-negative electrode opposing area, and, furthermore, an average reaction rate improving (decreasing the average distance between positive and negative electrode active materials) effect can be anticipated due to the decrease in the amount of the active material per opposing area in deeper regions (inner side) (the active material in deeper regions is less reactive). In this secondary battery 10, the length of one side of the columnar electrode is more preferably 100 μm to 300 μm. Within this range, high energy density can be easily obtained.

Figure 4A:
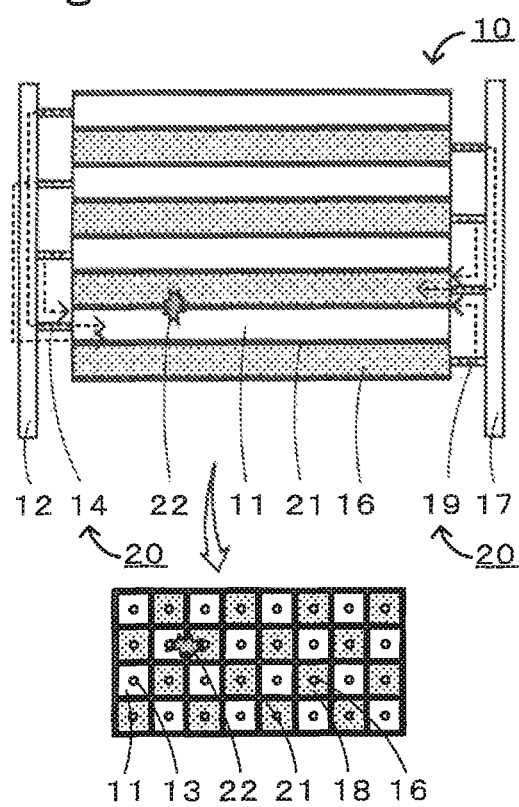
FIG. 4 is a schematic diagram illustrating one example of internal short-circuiting of the secondary battery 10.
Figure 4B:
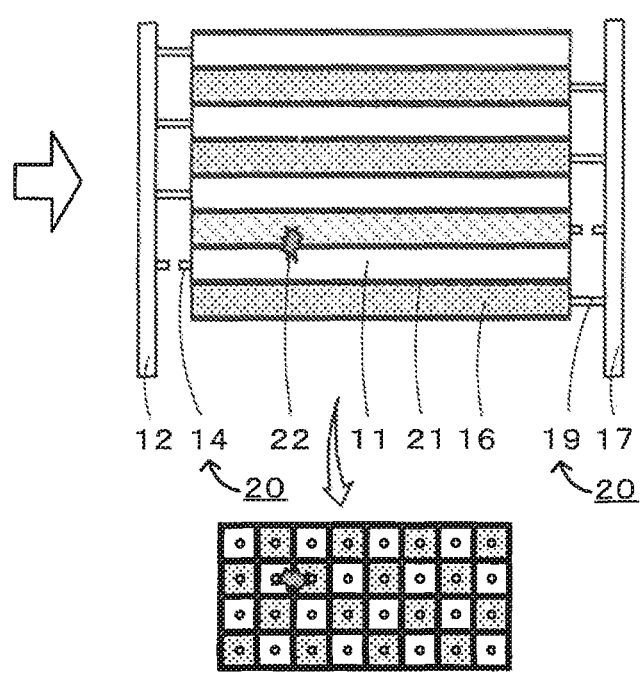
Figure 5A:
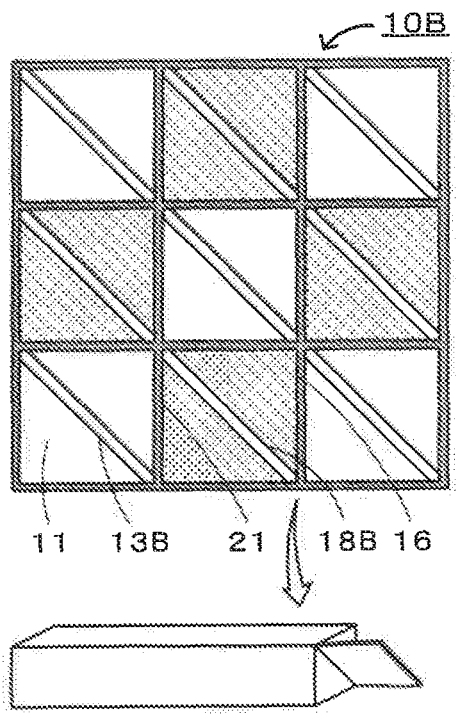
FIG. 5 includes cross-sectional views illustrating examples of secondary batteries 10B to 10E.
Figure 5B:
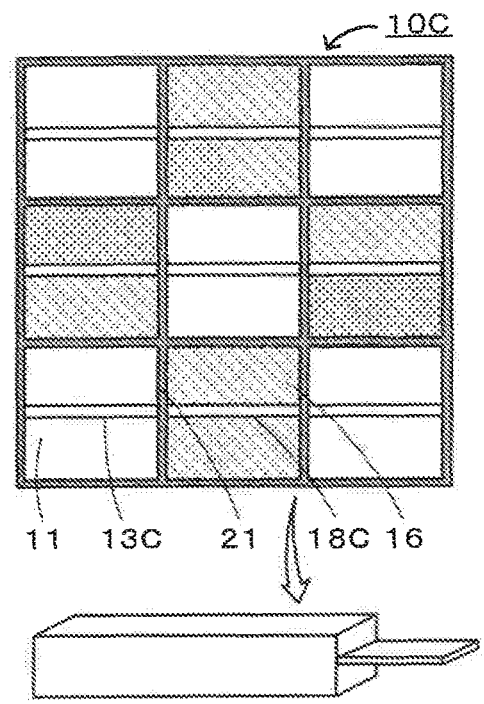
Figure 5C:
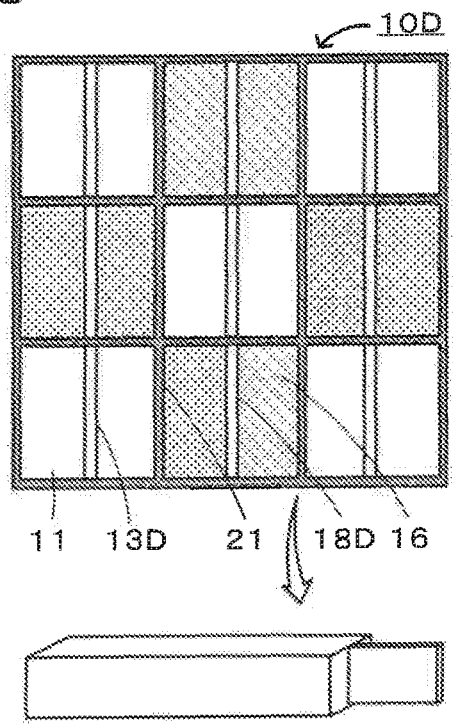
Figure 5D:
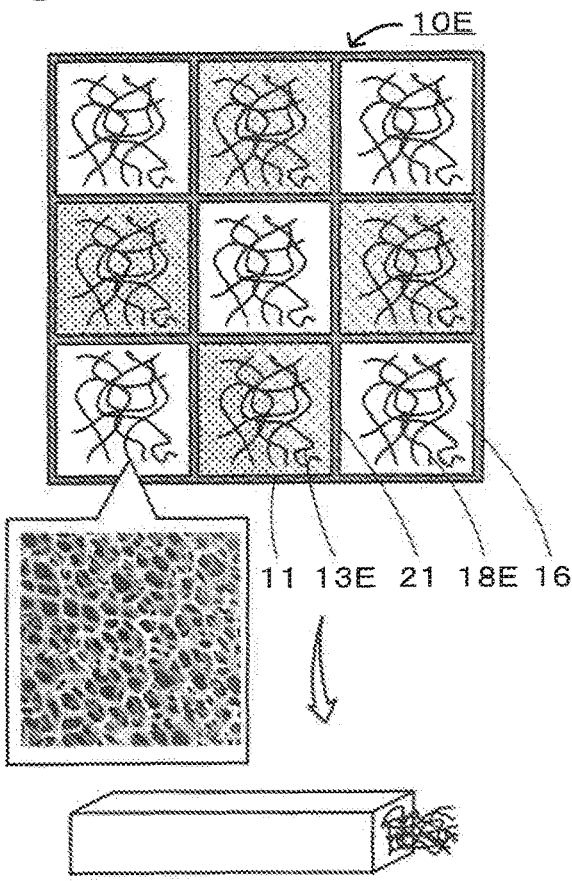

Next, occurrence of internal short-circuiting in the secondary battery 10 is described. FIG. 4 includes schematic diagrams illustrating one example of internal short-circuiting in the secondary battery 10. As illustrated in FIG. 4, when a short-circuited site 22 occurs in the secondary battery 10 for some reason (refer to FIG. 4A), the current concentrates on the connecting unit of the electrodes at the short-circuited site. Thus, the first connecting unit 14 and the second connecting unit 19 on which the current has concentrated are heated to higher temperatures and melt (refer to FIG. 4B). As such, in the secondary battery 10, since the current collecting wires 13 and 18 that establish parallel connections and connections inside the electrodes are divided, the first connecting unit 14 and the connecting unit 19 are allowed to melt by the current concentration when internal short-circuiting occurs and thus can function as a fuse mechanism. In addition, in the secondary battery 10, the internal short-circuited site can be electronically separated and heat generation in the secondary battery 10 can be stopped; thus, when internal short-circuiting uncontrollable from the outside occurs, safety can be further enhanced. Preferably, the electrodes are divided into about fifty or more in order for the fuse mechanism 20 to melt when short-circuiting occurs but not during normal charging and discharging.

According to the secondary battery 10 described in detail above, a secondary battery having an increased energy density can be provided. The reasons why such an effect is obtained are presumably as follows. For example, in order to increase the energy density of an existing electrode structure in which an active material is formed on current collectors formed of metal foils and the current collectors are stacked with separators therebetween, the coating amount and the density of the electrode mixture on the current collecting foils must be increased; however, this may cause troubles such as degradation of ion conductivity. In contrast, since the secondary battery 10 of the present disclosure employs a structure in which columnar electrodes are bound together, the ion conduction distance can be further shortened. Moreover, the secondary battery of the present disclosure does not require foil-shaped current collectors inside the structure, and the separators and the like are replaced with separation membranes to reduce thickness so that the space occupancy ratio of the active materials can be further increased. Thus, the energy density can be further increased.

According to the secondary battery 10, a secondary battery having an increased energy density and higher safety can be provided. The reasons behind this effect is, for example, that the structure in which columnar electrodes are bound together is employed so that the energy density can be further increased. Moreover, safety can be further enhanced by using, as the fuse mechanism, the connecting units that electrically connect the bound structure electrodes to the current collecting units.

In the secondary battery 10 described above, the current collecting wires 13 and the current collecting wires 18 are described as having a circular cross section, but are not limited to this. FIG. 5 includes cross-sectional views illustrating some examples of secondary batteries 10B to 10E. For example, the secondary battery 10B is equipped with current collecting foils 13B and 18B that are diagonally arranged in a cross section of each electrode. This secondary battery 10B is equipped with a fuse mechanism that uses the current collecting foils 13B and 18B as the connecting units. The secondary battery 10C is equipped with current collecting foils 13C and 18C that are horizontally arranged in a cross section of each electrode. This secondary battery 10C is equipped with a fuse mechanism that uses the current collecting foils 13C and 18C as the connecting units. The secondary battery 10D is equipped with current collecting foils 13D and 18D that are vertically arranged in a cross section of each electrode. This secondary battery 10D is equipped with a fuse mechanism that uses the current collecting foils 13D and 18D as the connecting units. The secondary battery 10E is equipped with current collecting members 13E and 18E that are three-dimensional network structures inside each electrode. This secondary battery 10E is equipped with a fuse mechanism that uses the current collecting members 13E and 18E as the connecting units. In these secondary batteries 10B to 10E also, the structure in which columnar electrodes are bound together is employed so that the energy density can be further increased. Moreover, safety can be further enhanced by using, as the fuse mechanism, the connecting units.

Second Embodiment

Figure 6:
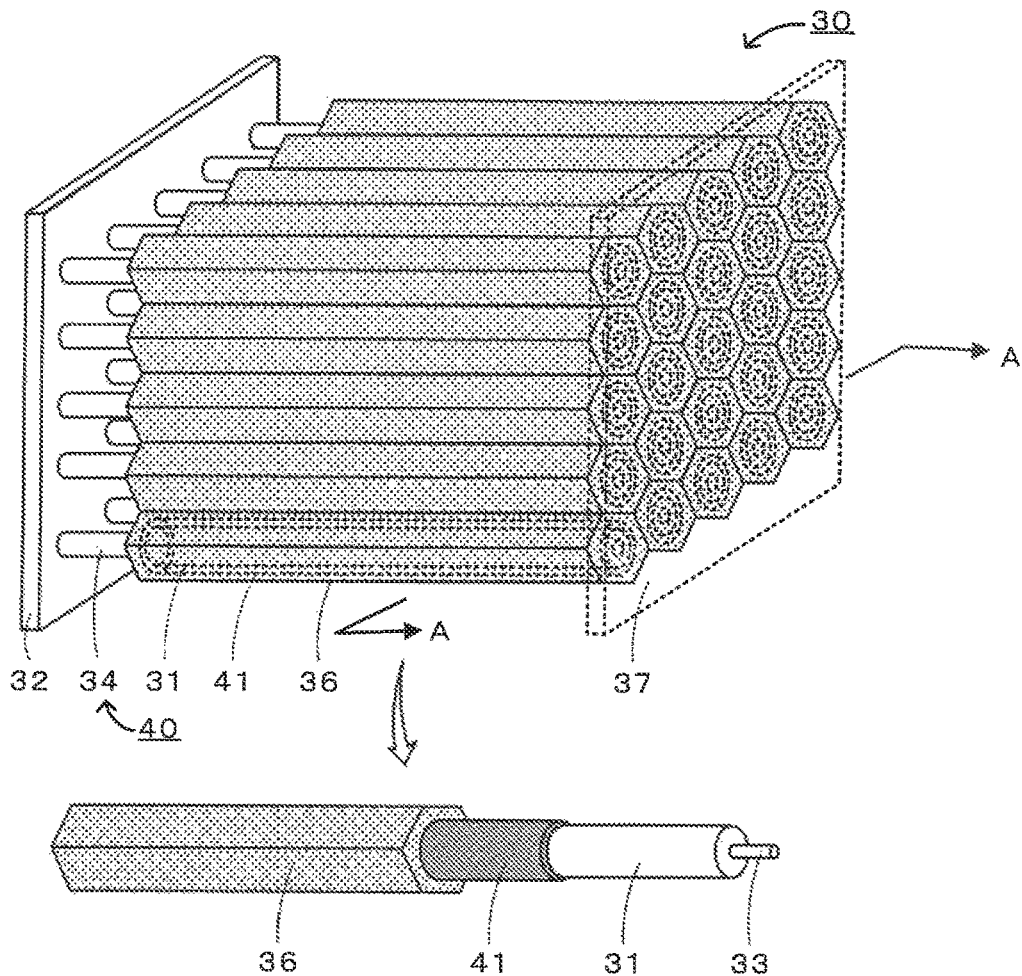
FIG. 6 is a schematic diagram illustrating one example of a secondary battery 30.
Figure 7:
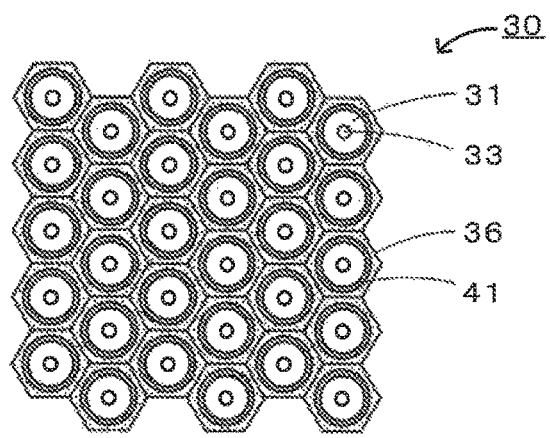
FIG. 7 is an A-A cross-sectional view of the secondary battery 30.

Next, a secondary battery 30 is described. FIG. 6 is a schematic diagram illustrating one example of the secondary battery 30. FIG. 7 is an A-A cross-sectional view of the secondary battery 30 illustrated in FIG. 6. As illustrated in FIGS. 6 and 7, the secondary battery 30 is equipped with first electrodes 31, a first current collecting unit 32, current collecting wires 33, first connecting units 34, second electrodes 36, a second current collecting unit 37, and separation membranes 41. The first connecting units 34 constitute a fuse mechanism 40. The secondary battery 30 is equipped with the first electrodes 31, which are columnar bodies having a circular cross section, and the second electrodes 36 formed of active material layers containing a second active material formed around the first electrodes 31. In other words, in the secondary battery 30, the second electrodes 36 are not columnar bodies. In the secondary battery 30, the materials constituting the constituent parts are the same as those in the secondary battery 10 and the descriptions therefor are omitted.

The first electrode 31 is a circular columnar body having a circular cross section and having a first active material. This secondary battery 30 may have a structure in which fifty or more first electrodes 31 are bound together. The outer perimeter of the first electrode 31 other than the end surfaces opposes the second electrodes 36 with the separation membranes 41 therebetween. The first electrode 31 is preferably a circular columnar body in which the length (thickness) in a radial direction is 15 μm or more and 300 μm or less. Within this range, the energy density per unit volume can be further increased. In addition, within this range, the carrier ion travelling distance can be further shortened, and charging and discharging can be performed with higher current. The current collecting wire 33 having a circular cross section is embedded in the first electrode 31. The current collecting wire 33 is extended to the outside so as to constitute the first connecting unit 34. The length (thickness) of the current collecting wire 33 in the radial direction may be the same as or different from that of the first connecting unit 34. The length of the current collecting wire 33 in the radial direction is preferably 50 μm or less, more preferably 40 μm or less, and yet more preferably 30 μm or less, for example. The current collecting wire 33 is preferably as thin as possible while securing the conductivity because the energy density per unit volume can be further improved. The length of the current collecting wire 33 in the radial direction is preferably 1 μm or more, more preferably 5 μm or more, and yet more preferably 10 μm or more, for example. From the viewpoint of securing the conductivity, the current collecting wire 33 is preferably thick.

The second electrode 36 has a second active material and is formed on the outer perimeter of the first electrode 31 with the separation membrane 41 therebetween. The second electrode 36 has a hexagonal cross sectional profile, and wraps the first electrode 31 having a circular columnar shape. The second electrode 36 is not limited to having the hexagonal profile as long as the second electrode 36 fills the gap between the first electrodes 31. The second electrode 36 is itself conductive, and thus the current collecting member is omitted. One end of the second electrode 36 is directly connected to the second current collecting unit 37. The second electrode 36 may be formed by, for example, forming a separation membrane 41 on the outer perimeter of the first electrode 31 and then applying the raw material for the second electrode 36 on the outer perimeter thereof.

The separation membrane 41 has ion conductivity for the ions (for example, lithium ions) serving as a carrier, and insulates between the first electrode 31 and the second electrode 36. The separation membrane 41 is formed on the entire outer perimeter surface of the first electrode 31 opposing the second electrode 36 and prevents short-circuiting between the first electrode 31 and the second electrode 36.

The fuse mechanism 40 includes first connecting units 34. The first connecting unit 34 is a member having one end connected to the first electrode 31 (current collecting wire 33) and the other end connected to the first current collecting unit 32, and melts when short-circuiting occurs inside the secondary battery 30. Each of the many first electrodes 31 (current collecting wires 33) has one first connecting unit 34 electrically connected thereto.

As with the secondary battery 10, when short-circuiting occurs in the secondary battery 30, the current concentrates on the first connecting unit 34 of the electrode at the short-circuited site. Thus, the first connecting unit 34 on which the current has concentrated is heated to a higher temperature and melts. As such, in the secondary battery 30 also, the internal short-circuited site can be electronically separated and heat generation in the secondary battery 30 can be stopped; thus, melts when internal short-circuiting occurs uncontrollable from the outside, safety can be further enhanced. In the secondary battery 30, since the first electrodes 31 having a circular columnar shape are bound together, the electrodes can store and release the carrier ions from the entire perimeters. Thus, according to the secondary battery 30, the reaction is accelerated by the increase in positive-negative electrode opposing area, and, furthermore, an average reaction rate improving effect can be anticipated due to the decrease in the amount of the active material per opposing area in deeper regions (inner side).

Third Embodiment

Figure 8:
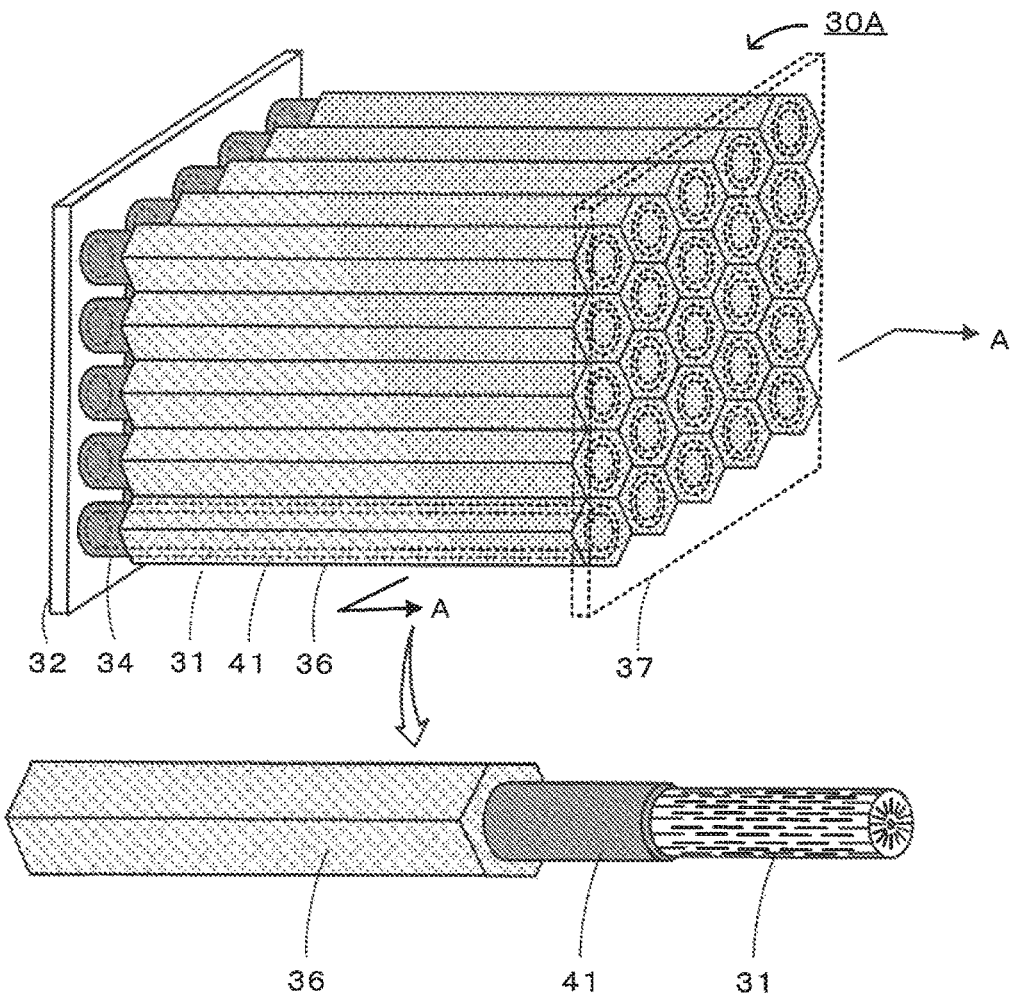
FIG. 8 is a schematic diagram illustrating one example of a secondary battery 30A.
Figure 9:
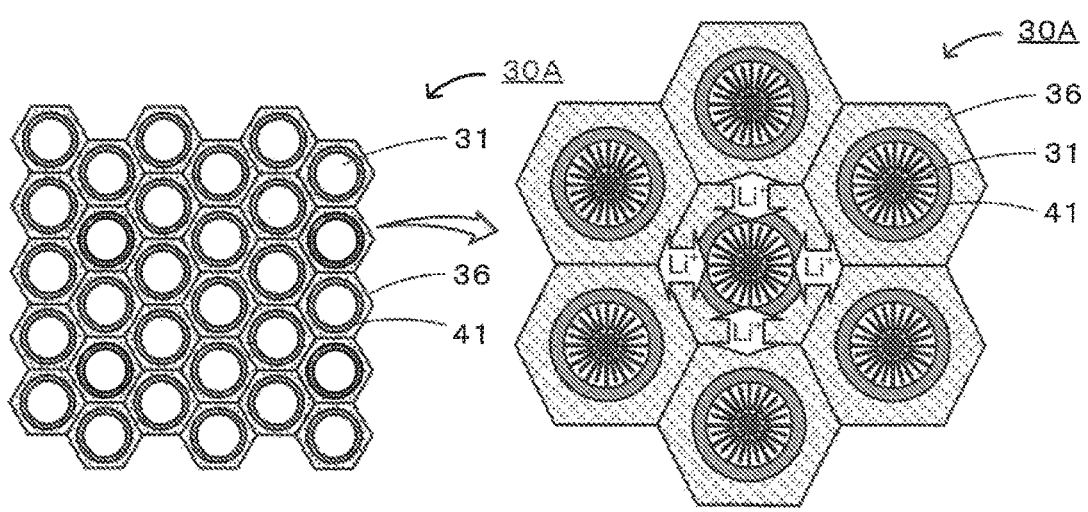
FIG. 9 is an A-A cross-sectional view of the secondary battery 30A.

Next, a secondary battery 30A is described. FIG. 8 is a schematic diagram illustrating one example of the secondary battery 30A. FIG. 9 is an A-A cross-sectional view of the secondary battery 30A illustrated in FIG. 8. As illustrated in FIGS. 8 and 9, the secondary battery 30A is equipped with first electrodes 31, a first current collecting unit 32, current collecting wires 33, first connecting units 34, second electrodes 36, a second current collecting unit 37, and separation membranes 41. The secondary battery 30A is equipped with the first electrodes 31, which are circular columnar bodies having a circular cross section, and the second electrodes 36 formed of active material layers containing a second active material formed around the first electrodes 31. In other words, in the secondary battery 30A, the second electrode 36 is not a columnar body. In the secondary battery 30A, the materials constituting the constituent parts are the same as those in the secondary battery 30 and the descriptions therefor are omitted.

The first electrode 31 is a circular columnar body having a circular cross section and having a first active material. This secondary battery 30A may have a structure in which fifty or more first electrodes 31 are bound together. The outer perimeter of the first electrode 31 other than the end surfaces opposes the second electrode 36 with the separation membrane 41 therebetween. The first electrode 31 is preferably a circular columnar body in which the length (thickness) in a radial direction is 10 μm or more and 200 μm or less. Within this range, the energy density per unit volume can be further increased. In addition, within this range, the carrier ion travelling distance can be further shortened, and charging and discharging can be performed with higher current. The first active material may be a fibrous or circular column-shaped carbon fiber. The carbon fiber is preferably a highly crystalline carbon fiber in which graphene structures are radially oriented from the center toward the outer perimeter and also oriented in the fiber length direction. Such a carbon fiber is preferable since it can store and release lithium ions serving as a carrier from the outer perimeters and has high ion conductivity. The first electrode 31 is itself conductive, and thus embedding of a current collecting wire or the like is omitted.

The second electrode 36 has a second active material and is formed on the outer perimeter of the first electrode 31 with the separation membrane 41 therebetween. The second electrode 36 has a hexagonal cross sectional profile, and wraps the first electrode 31 having a circular columnar shape. The second electrode 36 is not limited to having the hexagonal profile as long as the second electrode 36 fills the gap between the first electrodes 31. The second electrode 36 is itself conductive, and thus the current collecting member is omitted. One end of the second electrode 36 is directly connected to the second current collecting unit 37. The second electrode 36 may be formed by, for example, forming a separation membrane 41 on the outer perimeter of the first electrode 31 and then applying the raw material for the second electrode 36 on the outer perimeter thereof.

The separation membrane 41 has ion conductivity for the ions (for example, lithium ions) serving as a carrier, and insulates between the first electrode 31 and the second electrode 36. The separation membrane 41 is formed on the entire outer perimeter surface of the first electrode 31 opposing the second electrode 36 and prevents short-circuiting between the first electrode 31 and the second electrode 36.

In the secondary battery 30A, as with the secondary battery 30, since the first electrodes 31 having a circular columnar shape are bound together, the electrodes can store and release the carrier ions from the entire perimeters. Thus, according to the secondary battery 30A, the reaction is accelerated by the increase in positive-negative electrode opposing area, and, furthermore, an average reaction rate improving effect can be anticipated due to the decrease in the amount of the active material per opposing area in deeper regions (inner side).

Next, a method for producing a secondary battery is described. The production method includes a separation membrane forming step and a binding step. In the separation membrane forming step, a separation membrane having ion conductivity and an insulating property is formed on the surface of a first electrode, which is a columnar body having a first active material. In the binding step, multiple first electrodes are bound together while being adjacent to second electrodes having a second active material with the formed separation membranes therebetween. Here, the steps for producing the secondary battery 30A are described as a specific example. FIG. 10 includes diagrams illustrating one example of the steps for producing the secondary battery 30A, where FIG. 10A illustrates a heat treatment step, FIG. 10B illustrates a separation membrane forming step, FIG. 10C illustrates a second active material forming step, FIG. 10D illustrates a conductive material adding step, and FIG. 10E illustrates a binding step. In the heat treatment step, the raw material for the carbon fiber is heat-treated so as to prepare a highly oriented carbon fiber oriented in the fiber length direction and in the outer perimeter surface. Next, a separation membrane is formed on the outer surface of the carbon fiber. The raw material for the separation membrane may be applied and dried. Next, a second active material is formed on the separation membrane. The second active material may be, for example, fine particles of the active material with a conductive material and a binder attached thereto. Such second active material particles may be prepared into a slurry and applied to the separation membrane. Next, a process of adding a conductive material is performed as needed. As the conductive material, a carbon material or metal particles (for example, Cu, Ni, or Al) may be used. The columnar bodies of the first electrodes prepared as such are arranged side-by-side and bound. As a result, the secondary battery 30A can be prepared.

It should be noted that the present disclosure is not limited by the embodiments described above and can naturally be implemented in various modifications without departing from the technical scope of the present disclosure.

Figure 11:
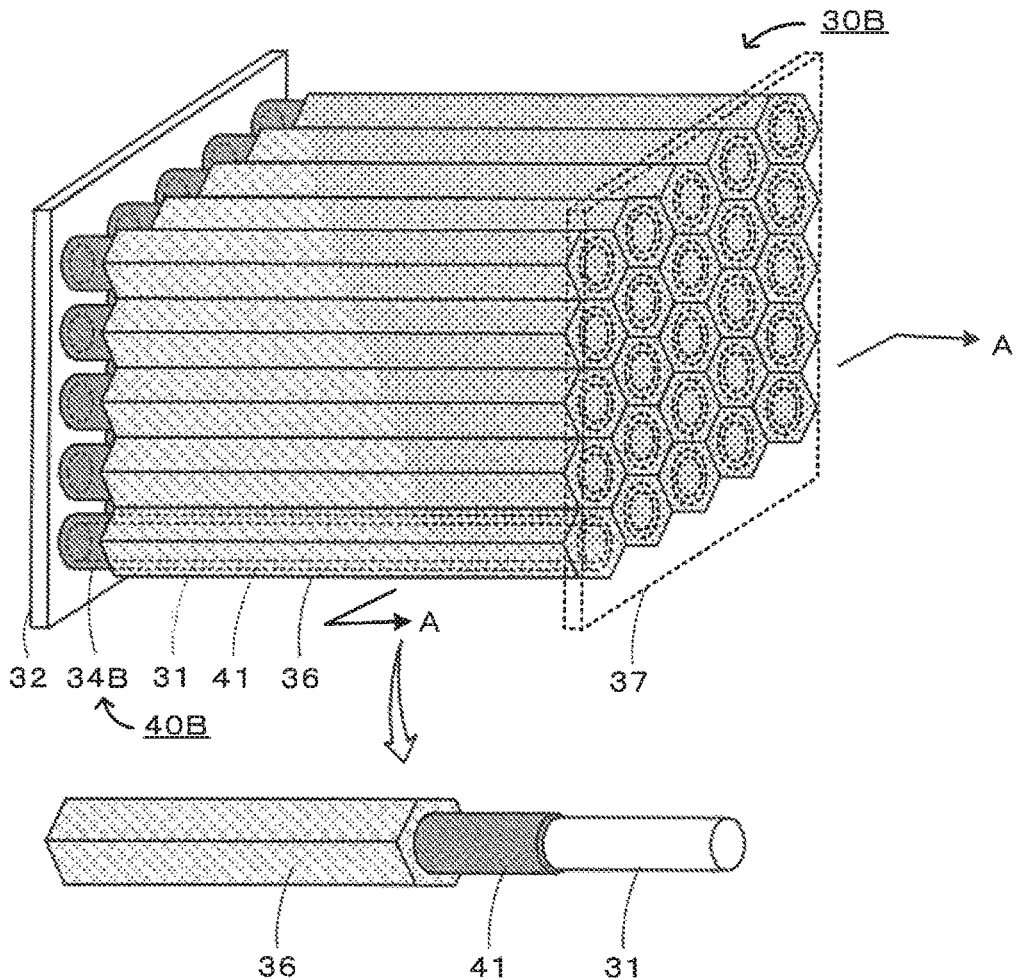
FIG. 11 is a schematic diagram illustrating one example of a secondary battery 30B.
Figure 12:
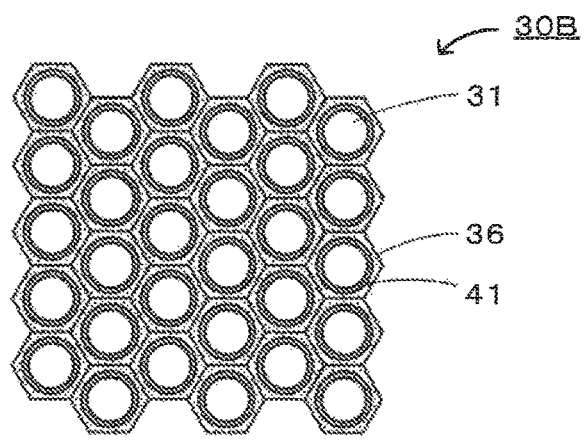
FIG. 12 is an A-A cross-sectional view of the secondary battery 30B.

For example, in the embodiment described above, in the secondary battery 30, the first electrode 31 has the current collecting wire 33; however, this is not limiting, and the current collecting wire 33 may be omitted for each electrode. FIG. 11 is a schematic diagram illustrating one example of a secondary battery 30B. FIG. 12 is an A-A cross-sectional view of the secondary battery 30B illustrated in FIG. 11. The first electrode 31 of the secondary battery 30B is itself conductive, and thus the current collecting wire 33 is omitted. The first electrode 31 is extended from the second electrode 36 and is electrically connected to the first current collecting unit 32. The fuse mechanism 40B includes a first connecting unit 34B that includes the first electrode 31. When internal short-circuiting or the like occurs in the secondary battery 30B also, the same effects as in the aforementioned secondary battery 30 and the like can be obtained since the first connecting unit 34B or the first current collecting unit 32 connected to the first connecting unit 34B is allowed to melt. In the secondary battery 30B, the first electrode 31 may be formed of carbon fibers, for example.

Figure 13:
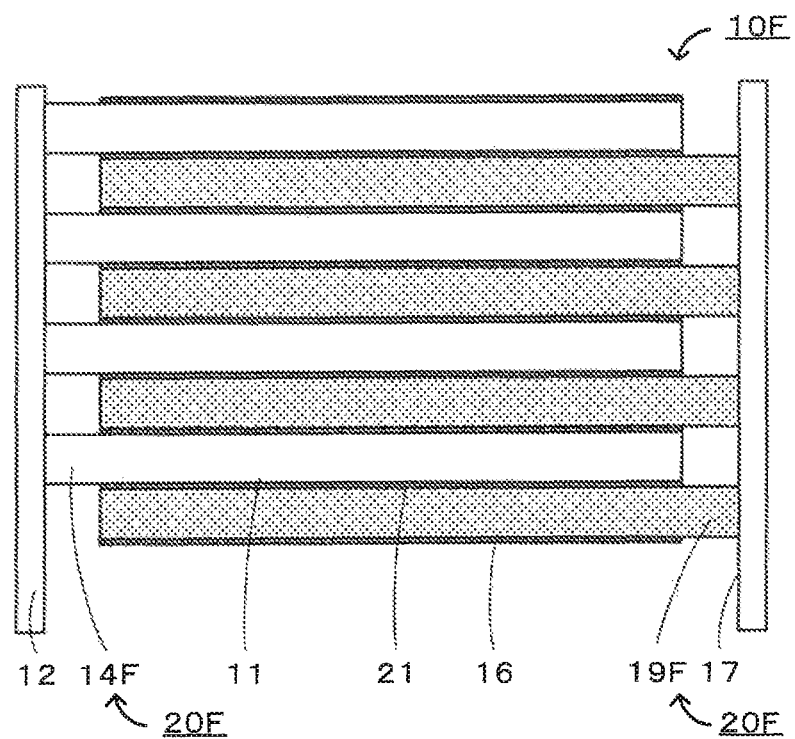
FIG. 13 is a schematic diagram illustrating one example of a secondary battery 10F.

Similarly, it has been described that, in the secondary battery 10, the first electrode 11 has the current collecting wire 13 and the second electrode 16 has the current collecting wire 18; however, this is not limiting, and the current collecting wire may be omitted for each electrode. FIG. 13 is a schematic diagram illustrating one example of a secondary battery 10F. The first electrode 11 of the secondary battery 10F is itself conductive, and thus the current collecting wire 13 is omitted. The first electrode 11 is directly electrically connected to the first current collecting unit 12. The second electrode 16 is itself conductive, and thus the current collecting wire 18 is omitted. The second electrode 16 is directly electrically connected to the second current collecting unit 17. The fuse mechanism 20F includes a first connecting unit 14F that includes the first electrode 11, and a second connecting unit 19F that includes the second electrode 16. When internal short-circuiting or the like occurs in the secondary battery 10F also, the same effects as in the aforementioned secondary battery 10 and the like can be obtained since the first connecting unit 14F, the second connecting unit 19F, or a part of the first current collecting unit 12 or the second current collecting unit 17 nearby is allowed to melt.

In the aforementioned secondary battery 10, the first electrode 11 is the negative electrode, and the second electrode 16 is the positive electrode; however, this is not limiting, and the first electrode may be the positive electrode and the second electrode may be the negative electrode. In the embodiments described above, the carrier of the secondary batteries is lithium ions; however, this is not limiting, and alkali ions such as sodium ions or potassium ions, or group 2 element ions such as calcium ions or magnesium ions may be used as the carrier. Moreover, the electrolyte solution is a non-aqueous electrolyte solution, but may be an aqueous electrolyte solution. Furthermore, the battery may be an all-solid battery in which the portion corresponding to the separation membrane and the electrolyte solution is formed of a solid electrolyte.

In the secondary batteries described above, the fuse mechanism is provided; however, the fuse mechanism is optional. Considering the safety of the secondary battery, the second battery is preferably equipped with the fuse mechanism described above.

In the description below, specific examples of preparation of the secondary batteries described above are described as Examples.

EXAMPLES

Example 1

A secondary battery 10 having the structure illustrated in FIG. 1 was prepared. First, a rectangular prism electrode, one side of which was 200 µm, a length of which was 30 mm, and which had a metal current collecting wire having a diameter of 50 µm provided therein was prepared for each of positive electrodes and negative electrodes. Extrusion molding was performed for preparation. The positive electrode was prepared by molding a mixture of Li(Ni, Co, Mn)$O_2$ serving as the positive electrode active material, acetylene black serving as the conductive material, and PVdF serving as the binder at a mass ratio of 90/7/3. The negative electrode was prepared by molding a mixture of graphite serving as the negative electrode active material and PVdF serving as the binder at a mass ratio of 97/3. A PVdF-HFP membrane was applied to the outer perimeter of each electrode by dip coating so that the thickness was 10 µm. Next, fifty sets of positive/negative electrodes were arranged in a grid shape and bound together so as to form an electrode structure in which wire-shaped current collecting wires were connected to the current collecting plates in parallel. Here, 3 mm of the wires were left to serve as the connecting units (fuse). The electrode structure was placed in an Al laminate bag, impregnated with an electrolyte solution (1 M-LiPF$_6$/EC+EMC+DMC), and sealed; and the obtained secondary battery was used as Example 1.

Figure 14:
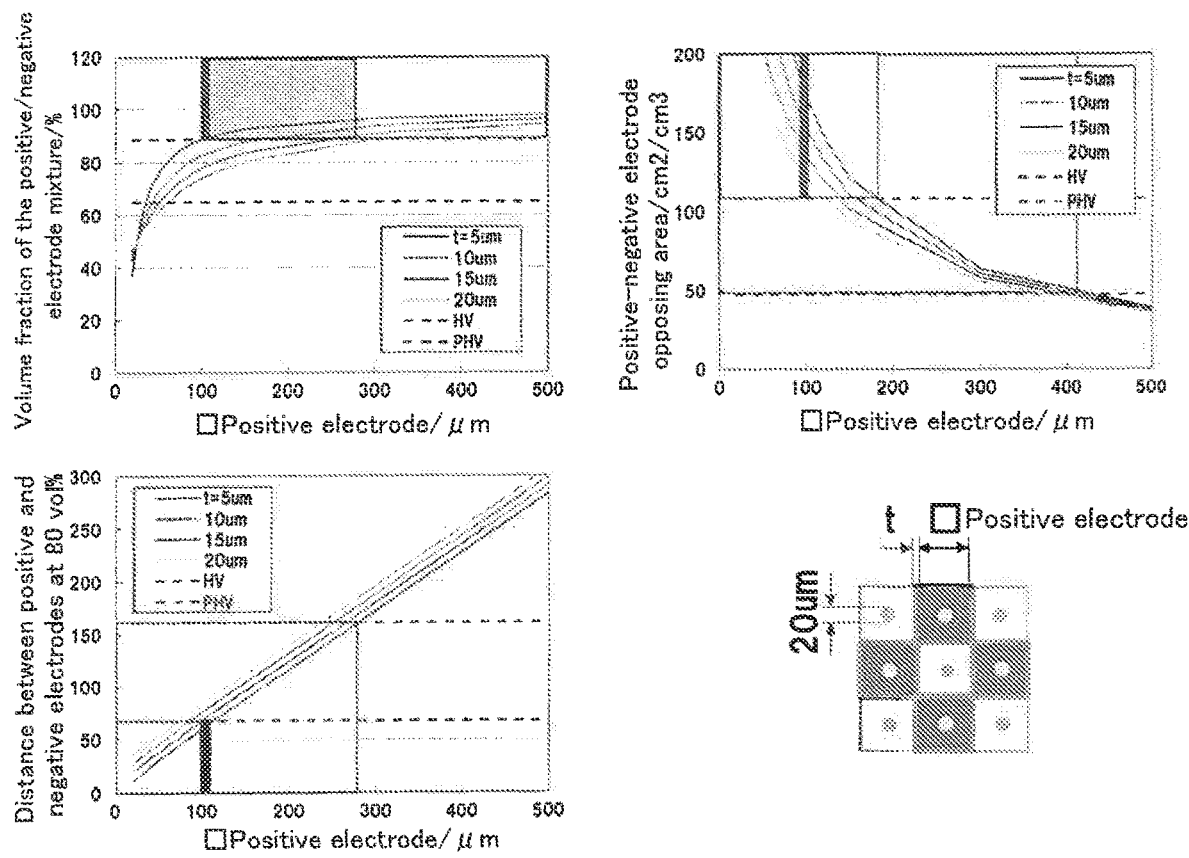
FIG. 14 includes graphs showing the relationships between the length of one side of an electrode, the volume fraction of the positive/negative electrode mixture, the positive-negative electrode opposing area, and the distance between the positive and negative electrodes at 80 vol % of the electrode.

FIG. 14 includes graphs showing the calculated relationships involving the volume fraction of the positive/negative electrode mixture, the positive-negative electrode opposing area, and the distance between the positive and negative electrodes at 80 vol % of the electrode plotted against the length of one side of the electrode in the secondary battery 10 illustrated in FIG. 1. In FIG. 14, calculation was performed for separation membrane thicknesses of 5 µm, 10 µm, 15 µm, and 20 µm. As shown in FIG. 14, it was found that when the length of one side of the electrode was in the range of 100 to 300 µm, the volume fraction exceeded 85%, the opposing area exceeded 50 cm$^2$, and the distance between the positive and negative electrodes was less than 150 µm, indicating that this range can achieve both high energy density and high output.

FIG. 15 is a table showing the calculated relationships involving the volume fraction of the positive/negative electrode mixture, the positive-negative electrode opposing area, and the distance between the positive and negative electrodes at 80 vol % of the electrode in a columnar body bound structure and an electrode foil stacked structure. The lengths of the sides of the positive electrode and the negative electrode, the thickness of the separation membrane, the diameter of the current collecting wire, etc., indicated in FIG. 15 are used for calculation in Examples 2 to 4. Comparative Example 1 is an existing electrode having a stacked structure, and the model of Comparative Example 2 is a high-energy-type electrode in which the thickness of the electrode mixture is larger than the existing electrode. As indicated in the table in FIG. 15, in Examples 2 to 4, the volume fraction of the positive/negative electrode mixture in the electrode exceeded 85%, which was about the same as 88.4% (high energy density) of Comparative Example 2 having a large thickness. In Examples 2 to 4, the positive-negative electrode opposing area exceeded 47.3 cm$^2$ of Comparative Example 2, which shows that these examples are advantageous in terms of high output and rapid charging. Furthermore, in Examples 2 to 4, the distance between the positive and negative electrodes when the active material that accounted for 80 vol % was 120 µm or less (ion travelling distance was shorter), which shows that these examples are advantageous in terms of rapid charging. It was found that these effects intensified as one side of the columnar electrode became as short as about 100 µm. In Examples 2 to 4, it was presumed that the current concentrates on the current collecting unit of the electrode at the short-circuited site when internal short-circuiting occurs, and the fuse function can be exhibited by melting. It should be noted that, in order to assure the safety of the battery, the fuse mechanism inside the battery is a significantly effective safety measure since the internal short-circuiting cannot be fully controlled from the outside. Overcharging and the like can be suppressed from the outside of the battery.

FIG. 16 is a table showing the calculated relationships involving the volume fraction of the positive/negative electrode mixture, the positive-negative electrode opposing area, and the distance between the positive and negative electrodes at 80 vol % of the electrode in a columnar body bound structure and an electrode foil stacked structure in the secondary battery 30. The diameter A of the negative electrode, the thickness X of the positive electrode, the thickness t of the separation membrane, etc., indicated in FIG. 16 are used for calculation in Examples 5 to 6. Comparative Example 3 is a high-energy-type electrode in which the thickness of the electrode mixture is larger than the existing electrode, and the model of Comparative Example 4 is an existing electrode having a stacked structure. Note that Reference Example 1 involves studies on the case in which the capacities of the positive and negative electrodes were increased from what have been common. As indicated in FIG. 16, it was found that when the structure of the secondary battery 30 is employed, the cell energy density can be set to 650 Wh/L or more and the positive-negative electrode opposing area can be set to 300 cm$^2$ or more by setting the diameter of the negative electrode to 20 to 50 μm and the thickness of the positive electrode to 5 to 15 μm. In Examples 5 and 6, it was presumed that the current concentrates on the current collecting unit of the electrode at the short-circuited site when internal short-circuiting occurs, and the fuse function can be exhibited by melting.

Example 7

A secondary battery 30A having the structure illustrated in FIG. 8 was prepared. First, a highly crystalline carbon fiber having a diameter of 50 μm and graphene oriented from the center toward the outer perimeter as well as in the length direction was cut to 10 cm (the longitudinal direction of the cell) to prepare a negative electrode (negative electrode active material). PVdF-HFP was applied to the outer perimeter of the carbon fiber by dip coating to form a separation membrane (electrolyte membrane) having a thickness of 5 μm and was dried. A positive electrode slurry was applied to the outer perimeter of the carbon fiber by dip coating, and was dried to increase the density. A mixture of Li(Ni, Co, Mn)O$_2$ serving as the positive electrode active material, acetylene black serving as the conductive material, and PVdF serving as the binder at a mass ratio of 90/7/3 mixed in a solvent was used as the positive electrode slurry. The coating amount of the positive electrode slurry was adjusted so that the positive/negative electrode volume ratio was 1.0. A number (for example, fifty) of carbon fibers needed for the cell capacity were bound together, and the density was increased so that the gaps between the bound columnar electrodes was substantially equal to the porosity in the positive electrodes so as to improve the electron conductivity of the positive electrodes. Next, a metal was disposed on the end surfaces of the carbon fibers of the negative electrode, and was fused and fixed to establish parallel connection. The obtained electrode structure was placed in an Al laminate bag, impregnated with an electrolyte solution (1 M-LiPF$_6$/EC+EMC+DMC), and sealed; and the obtained secondary battery was used as Example 7.

Figure 17:
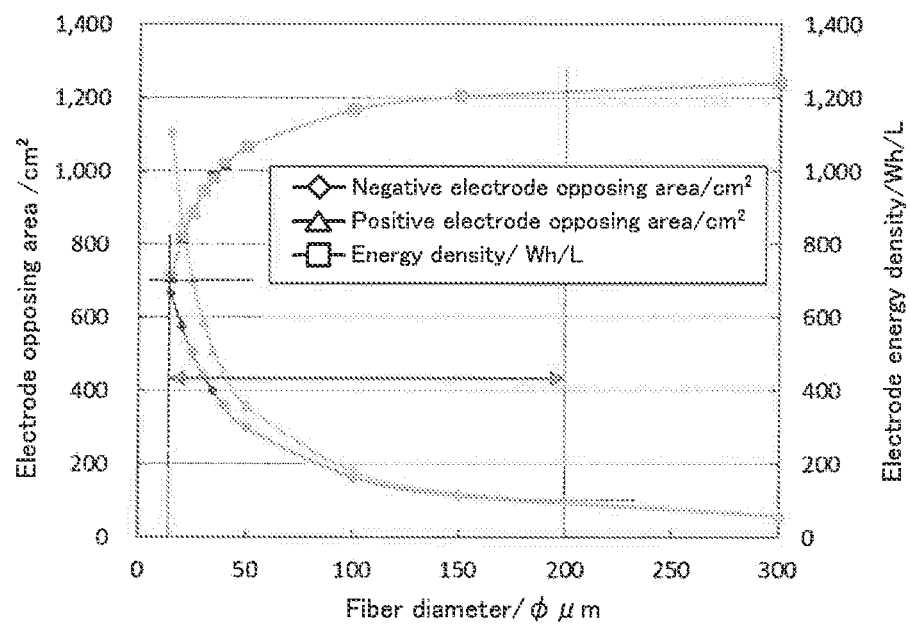
FIG. 17 is a graph showing the relationship between the diameter of the fiber-shaped negative electrode active material and the electrode opposing area.
Figure 18:
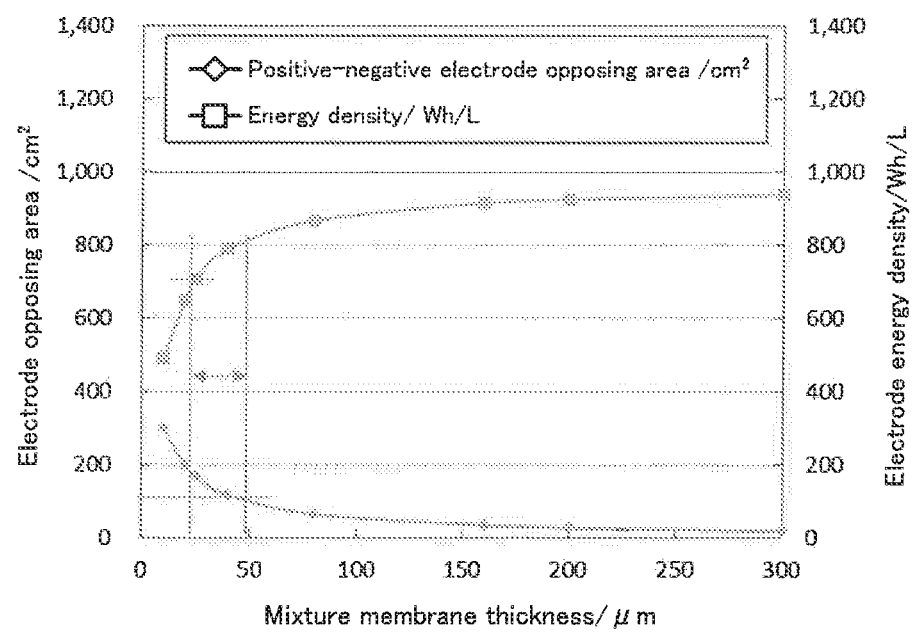
FIG. 18 is a graph showing the relationship between the mixture membrane thickness and the electrode opposing area in an existing structure in which current collecting foils are stacked.

FIG. 17 is a graph showing the relationship between the diameter of the fiber-shaped negative electrode active material and the electrode opposing area. FIG. 18 is a graph showing the relationship between the mixture membrane thickness and the electrode opposing area in an existing structure in which current collecting foils were stacked. Here, the energy density of the secondary battery 30 was investigated in further detail. In FIG. 17, the thickness t of the separation membrane was set to 5 μm, and the electrode opposing area and the energy density when the fiber diameter of the negative electrode active material was changed were determined by calculation. In FIG. 18, the thickness t of the separation membrane was set to 5 μm, the positive electrode current collecting foil thickness B was set to 12 μm, and the negative electrode current collecting foil thickness D was set to 10 μm for calculation. As indicated in FIG. 17, it was found that when the fiber diameter is in the range of 10 μm or more and 200 μm or less, the electrode opposing area is 100 cm$^2$ or more, that is, the area in which the carrier ions travel in and out increases, and thus that an energy density as high as 700 Wh/L or more can be achieved. It was also found that, with this secondary battery 30, the maximum is 1210 Wh/L. Meanwhile, as indicated in FIG. 18, it was found that according to the existing stacked structure, the mixture membrane thickness that exhibits an electrode opposing area of 100 cm$^2$ or more and an energy density of 700 Wh/L or more is 25 to 50 μm, and the energy density is 810 Wh/L at most; thus, it is difficult to obtain a high energy density.

As described above, it was found that, according to the electrode structures of Examples, high output, rapid charging properties, and high safety can be achieved while the energy density is improved to 600 Wh/L (the electrode mixture volume fraction of about 88%) suitable for electric vehicles by using a positive electrode active material, a negative electrode active material, and an organic electrolyte solution used in Li batteries.

It should be noted that the present disclosure is not limited by the examples described above and can naturally be implemented in various modifications without departing from the technical scope of the present disclosure.

For example, the electrodes may be prepared by any process, and the shape thereof may be round or hexagonal in addition to the rectangular prism. The current collecting member may be a metal foam or the like instead of a current collecting wire. The separation membrane covering the electrode need not be a polymer electrolyte and may be a solid electrolyte (oxide or sulfide), a gel polymer electrolyte, or an intrinsic polymer electrolyte (such as PEO). The electrolyte solution need not be a LiPF$_6$-based electrolyte solution used in Li batteries, and may be a water-based electrolyte solution, a concentrated organic electrolyte solution, an incombustible organic electrolyte solution that uses an incombustible solvent as the solvent, or a solid electrolyte (all-solid battery).

The present application claims priority to Japanese Patent Application No. 2017-47348 filed Mar. 13, 2017 and Japanese Patent Application No. 2017-47349 filed Mar. 13, 2017, the entire contents of which are incorporated herein by reference.

INDUSTRIAL APPLICABILITY

The present disclosure is applicable in the technical field of secondary batteries.

REFERENCE SIGNS 10, 10B to F, 30, 30A, 30B secondary battery; 11, 31 first electrode; 12, 32 first current collecting unit; 13, 33 current collecting wire; 13B to 13D current collecting foil; 13E current collecting member; 14, 14F, 34 first connecting unit;

16, 36 second electrode; 17, 37 second current collecting unit; 18 current collecting wire; 18B to 18D current collecting foil; 18E current collecting member; 19, 19F second connecting unit; 20, 40, 40B fuse mechanism; 21, 41 separation membrane; 22 short-circuited site

The invention claimed is:

1. A secondary battery comprising:
   a first electrode which is a columnar body having a first active material;
   a first current collecting unit connected to the first electrode;
   a second electrode having a second active material, the second electrode having a cross sectional profile different from a cross sectional profile of the first electrode and which wraps around the columnar body of the first electrode;
   a second current collecting unit connected to the second electrode; and
   a separation membrane that has ion conductivity and insulates between the first electrode and the second electrode, wherein:
   the secondary battery has a structure in which a plurality of the first electrodes each being wrapped around by the corresponding second electrode with the separation membrane therebetween, are bound together without a gap between the plurality of the first electrodes,
   the secondary battery has at least one fuse structure selected from
      a structure in which a first connecting unit that is connected to each of the first electrodes and melts when short-circuiting occurs is connected to the first current collecting unit, and
      a structure in which a second connecting unit that is connected to the second electrode and melts when short-circuiting occurs is connected to the second current collecting unit,
   when the fuse structure has the first connecting unit, an electronic resistance of the first electrode is more than or equal to twice an electronic resistance of the first connecting unit, and
   when the fuse structure has the second connecting unit, an electronic resistance of the second electrode is more than or equal to twice an electronic resistance of the second connecting unit.

2. The secondary battery according to claim 1, wherein the second electrode is formed of an active material layer that contains the second active material and that wraps around the first electrode.

3. The secondary battery according to claim 1, wherein the first electrode has, as the first active material, a carbon material in which crystals are oriented in a longitudinal direction.

4. The secondary battery according to claim 1, wherein the first electrode has, as the first active material, a carbon material in which crystals are radially oriented from a center toward an outer perimeter surface when viewed in a cross section taken in a direction orthogonal to a longitudinal direction.

5. The secondary battery according to claim 1, wherein the first electrode has, as the first active material, a carbon fiber, and the carbon fiber has a diameter in a range of 10 μm or more and 200 μm or less.

6. The secondary battery according to claim 1, wherein the first electrode is a circular columnar body or a polygonal prism, and
fifty or more of the first electrodes are connected in parallel to the first current collecting unit.

7. The secondary battery according to claim 1, wherein the first electrode is a polygonal prism or a circular columnar body in which a length of one side or a length in a radial direction is 10 μm or more and 300 μm or less, and an outer perimeter other than end surfaces opposes the second electrode with the separation membrane therebetween.

8. The secondary battery according to claim 1, wherein the first connecting unit is at least one of a current collecting wire, a current collecting foil, and a three-dimensional network structure embedded in the first electrode and extending from the first electrode, and
the second connecting unit is at least one of a current collecting wire, a current collecting foil, and a three-dimensional network structure embedded in the second electrode and extending from the second electrode.

9. The secondary battery according to claim 1, wherein the first connecting unit is thinner than the first electrode, and
the second connecting unit is thinner than the second electrode.

10. The secondary battery according to claim 1, wherein the fuse structure has the first connecting unit.

11. The secondary battery according to claim 1, wherein the first electrode is a polygonal prism or a circular columnar body in which a length of one side or a length in a radial direction is 15 μm or more and 300 μm or less, and an outer perimeter other than end surfaces opposes the second electrode with the separation membrane therebetween.

12. A method for producing the secondary battery according to claim 1, the method comprising:
   a separation membrane forming step of forming the separation membrane having ion conductivity and an insulating property on a surface of the first electrode which is the columnar body having the first active material;
   a second electrode forming step of applying a raw material having the second active material for the second electrode on an outer perimeter of the separation membrane, to wrap around the first electrode; and
   a binding step of binding the plurality of the first electrodes, each being wrapped around by the corresponding second electrode with the separation membrane therebetween, without a gap between the plurality of the first electrodes.

* * * * *